United States Patent
Choi et al.

(10) Patent No.: US 10,270,635 B2
(45) Date of Patent: Apr. 23, 2019

(54) METHOD AND DEVICE FOR CONFIGURING SIGNAL FIELD IN WIRELESS LAN SYSTEM

(71) Applicant: LG ELECTRONICS INC., Seoul (KR)

(72) Inventors: Jinsoo Choi, Seoul (KR); Dongguk Lim, Seoul (KR); Hangyu Cho, Seoul (KR); Wookbong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 9 days.

(21) Appl. No.: 15/563,945

(22) PCT Filed: Apr. 4, 2016

(86) PCT No.: PCT/KR2016/003459
§ 371 (c)(1),
(2) Date: Oct. 2, 2017

(87) PCT Pub. No.: WO2016/159737
PCT Pub. Date: Oct. 6, 2016

(65) Prior Publication Data
US 2018/0131553 A1 May 10, 2018

Related U.S. Application Data

(60) Provisional application No. 62/186,384, filed on Jun. 30, 2015, provisional application No. 62/166,637, (Continued)

(51) Int. Cl.
*H04L 27/26* (2006.01)
*H04L 5/02* (2006.01)
(Continued)

(52) U.S. Cl.
CPC ........ *H04L 27/2613* (2013.01); *H04L 1/0004* (2013.01); *H04L 5/0007* (2013.01);
(Continued)

(58) Field of Classification Search
CPC ........... H04W 36/04; H04W 36/00835; H04W 72/0453; H04W 84/12; H04B 7/0452; H04B 7/04
(Continued)

(56) References Cited

U.S. PATENT DOCUMENTS

2014/0119327 A1* 5/2014 Oh .................... H04L 1/0083
370/329
2015/0009894 A1* 1/2015 Vermani ............... H04L 1/0072
370/328
(Continued)

FOREIGN PATENT DOCUMENTS

WO 2015016684 2/2015

OTHER PUBLICATIONS

Van Nee, et al., "VHT-SIG-A and VHT-SIG-B Field Structure", doc.: IEEE 802.11-10/1052r0, Sep. 2010, 10 pages.
(Continued)

*Primary Examiner* — Phong La
(74) *Attorney, Agent, or Firm* — Lee, Hong, Degerman, Kang & Waimey

(57) ABSTRACT

The present specification presents a configuration technique of a field for control information in a wireless communication system. Specifically, presented is a configuration technique of a signal field including user-specific information in a wireless LAN system. A plurality of MCS techniques are applied to each field of a signal field, according to the present embodiment, and each field can be ordered according to the MCS techniques. The signal field according to the present embodiment can be used for a single user or multiple users, wherein the length of each field can be determined for blind decoding of the single user and the multiple users. The signal field according to the present embodiment can be an SIG-B field according to a wireless LAN standard.

12 Claims, 18 Drawing Sheets

Related U.S. Application Data filed on May 26, 2015, provisional application No. 62/163,989, filed on May 20, 2015, provisional application No. 62/142,484, filed on Apr. 3, 2015.

(51) Int. Cl.
*H04L 25/38* (2006.01)
*H04L 27/02* (2006.01)
*H04L 1/00* (2006.01)
*H04L 5/00* (2006.01)
*H04B 7/0452* (2017.01)
*H04W 84/12* (2009.01)

(52) U.S. Cl.
CPC .............. *H04L 5/0023* (2013.01); *H04L 5/02* (2013.01); *H04L 25/38* (2013.01); *H04L 27/02* (2013.01); *H04B 7/0452* (2013.01); *H04W 84/12* (2013.01)

(58) Field of Classification Search
USPC ........................................................ 370/331
See application file for complete search history.

(56) References Cited

U.S. PATENT DOCUMENTS

| | | | |
|---|---|---|---|
| 2015/0023335 A1* | 1/2015 | Vermani | H04B 7/0452 370/338 |
| 2016/0119453 A1* | 4/2016 | Tian | H04L 5/04 370/338 |
| 2016/0134406 A1* | 5/2016 | Chu | H04L 5/0037 370/329 |
| 2016/0227436 A1* | 8/2016 | Vermani | H04W 28/06 |
| 2017/0373816 A1* | 12/2017 | Son | H04L 5/001 |

OTHER PUBLICATIONS

Stacey, et al., "Specification Framework for TGax", doc.: IEEE 802.11-15/0132r4, Mar. 2015, 6 pages.

PCT International Application No. PCT/KR2016/003459, Written Opinion of the International Searching Authority dated Jul. 12, 2016, 4 pages.

\* cited by examiner

METHOD AND DEVICE FOR CONFIGURING SIGNAL FIELD IN WIRELESS LAN SYSTEM

CROSS-REFERENCE TO RELATED APPLICATIONS

This application is the National Stage filing under 35 U.S.C. 371 of International Application No. PCT/KR2016/003459, filed on Apr. 4, 2016, which claims the benefit of U.S. Provisional Application Nos. 62/142,484, filed on Apr. 3, 2015, 62/163,989, filed on May 20, 2015, 62/166,637, filed on May 26, 2015, and 62/186,384, filed on Jun. 30, 2015, the contents of which are all hereby incorporated by reference herein in their entirety.

BACKGROUND OF THE INVENTION

Field of the Invention

The present disclosure relates to a technique for configuring a signal field in wireless communication, and more particularly, to a method and device for configuring a signal field in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present disclosure presents an example of solving problems associated with decoding a signal field that is configured to contain user-specific information.

The present disclosure presents an example of solving problems associated with the size of a signal field when a single user/or multiple users are allocated in a wireless LAN system.

The present disclosure presents an example of solving problems that occur with decoding when multiple MCSs are applied to a signal field.

An exemplary embodiment of the present disclosure provides a method and device for transmitting signals available in wireless LAN.

The method according to the exemplary embodiment of the present disclosure may include: configuring a first signal field containing first control information by a transmitting station; configuring a second signal field containing second control information by the transmitting station; and transmitting a PPDU (physical layer protocol data unit) containing the first signal field, the second signal field, and a data field.

The first control information may include control information for demodulation of the second control information.

The second control information may include control information for demodulation of the data field.

The second signal field may include a common field containing common control information and a user-specific field containing user-specific control information.

The user-specific field may be used for a single user or multiple users assigned to a predefined band.

The user-specific field may be encoded separately from the common field, and include at least one user field.

If the user-specific field includes a plurality of user files, the size of each user field may be the same, irrespective of whether the user field is used for a single user or multiple users.

One example of the present disclosure allows for efficient decoding of a signal field that is configured to contain user-specific information.

One example of the present disclosure allows for efficient configuration of the size of a signal field when a single user/or multiple users are allocated in a wireless LAN system.

One example of the present disclosure presents an efficient ordering technique to use when multiple MCSs are applied to a signal field.

DESCRIPTION OF EXEMPLARY EMBODIMENTS

Figure 1:
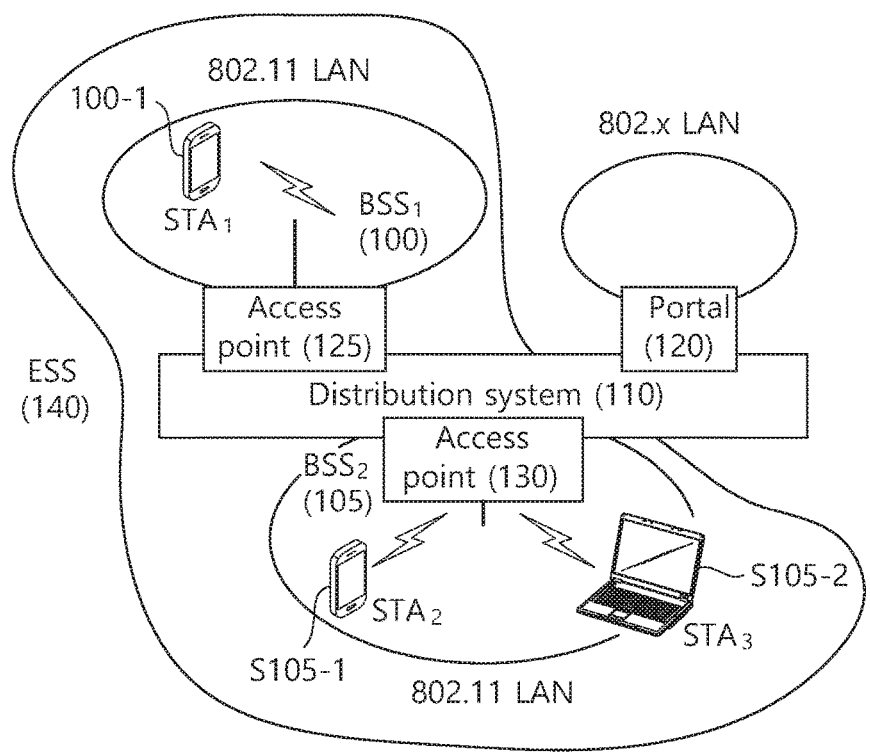
FIG. 1 is a conceptual view illustrating the structure of a wireless local area network (WLAN).
Figure 1:
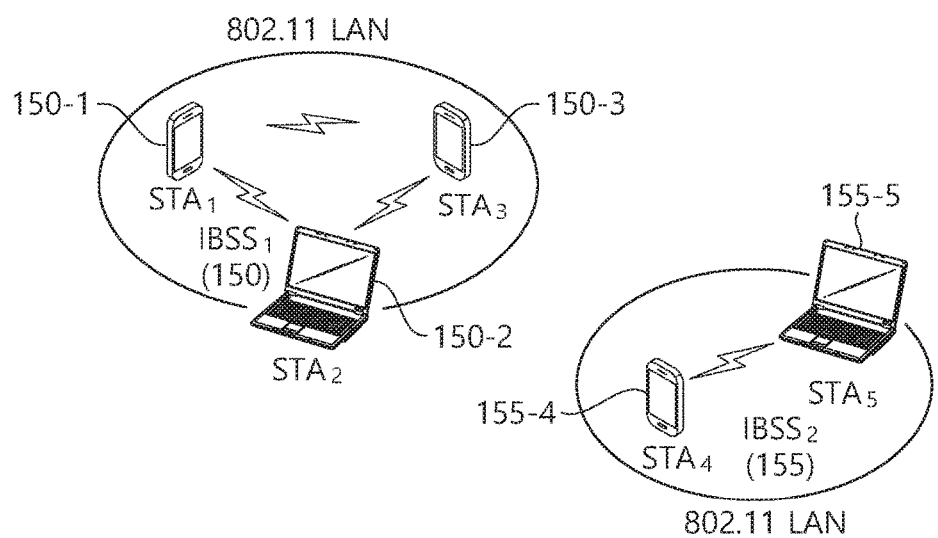

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
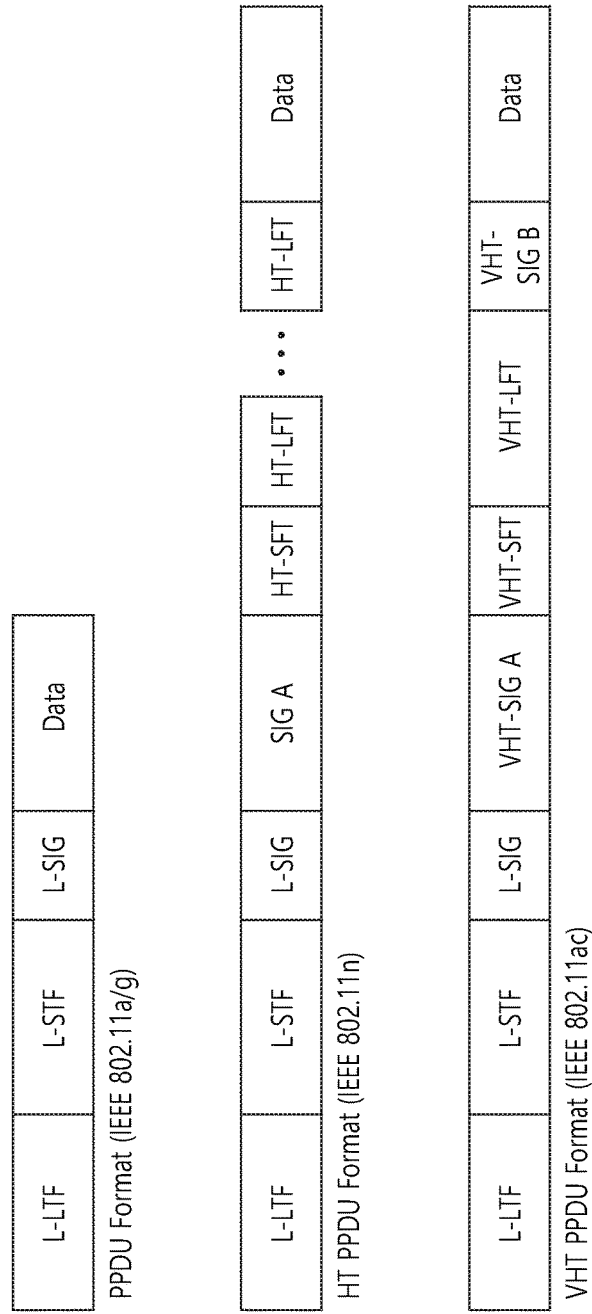
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
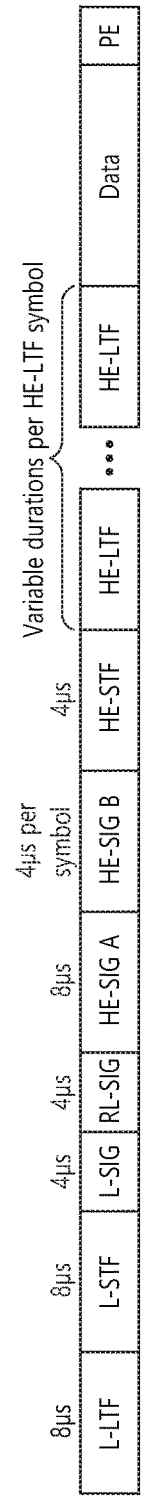
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
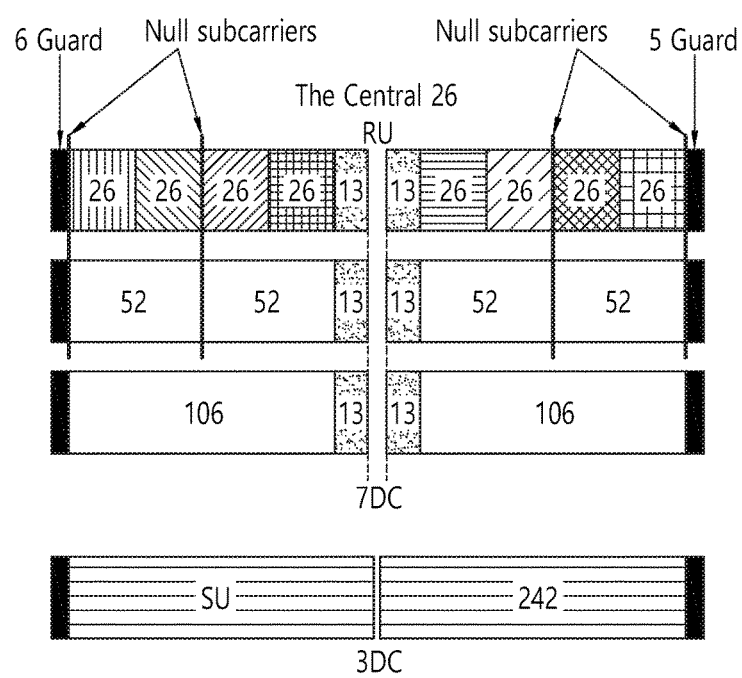
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
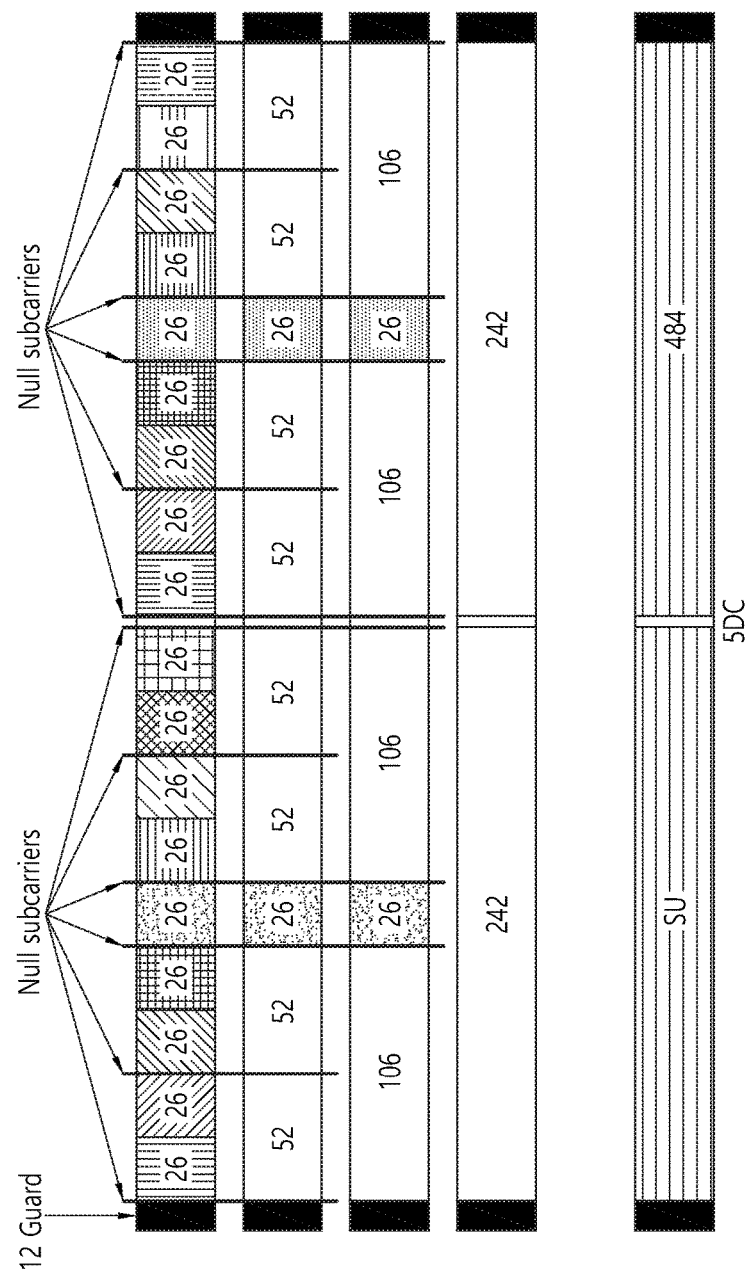
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
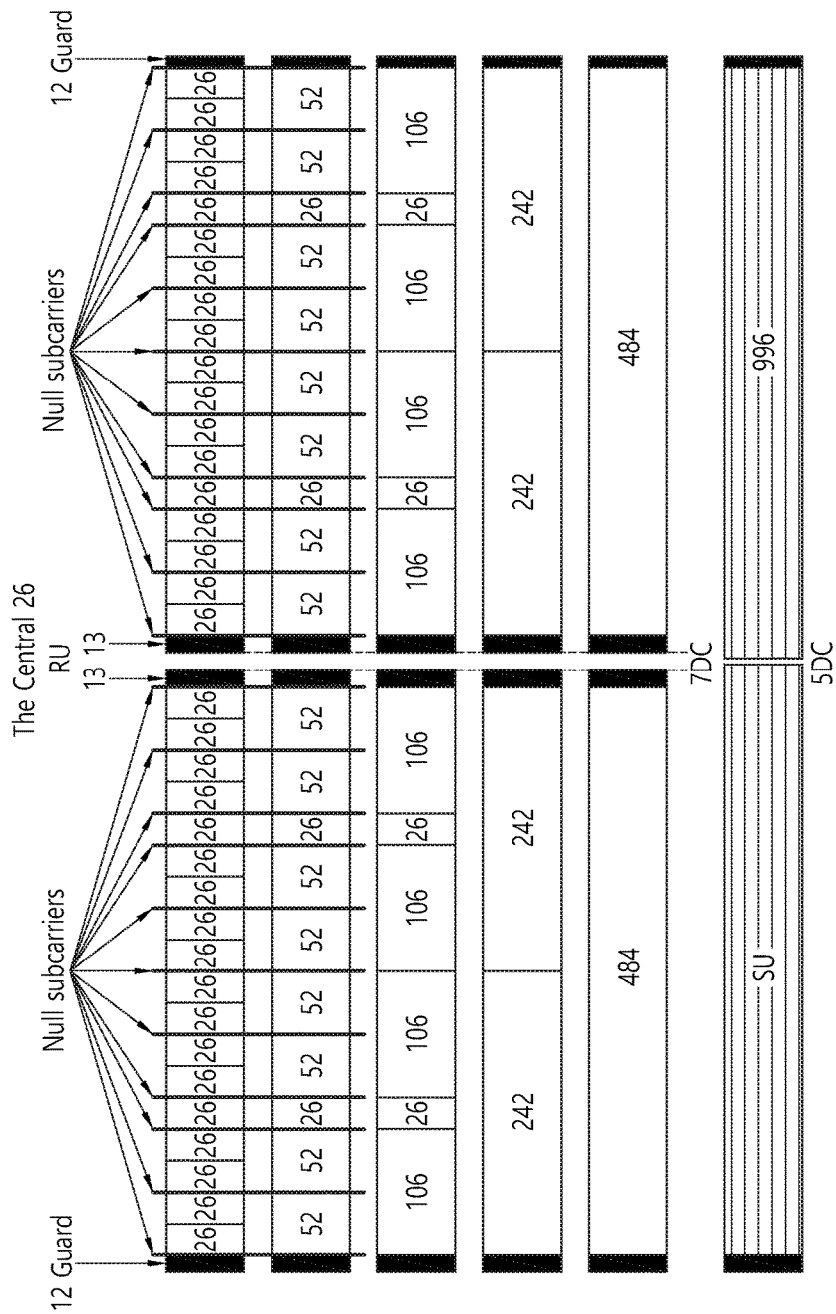
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
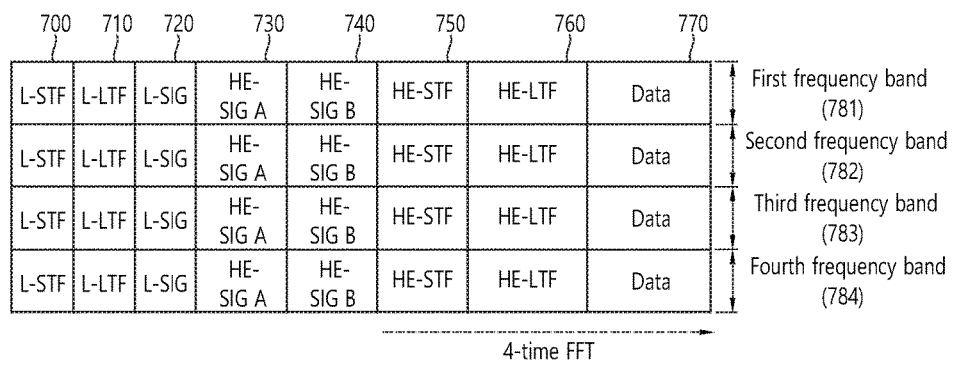
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
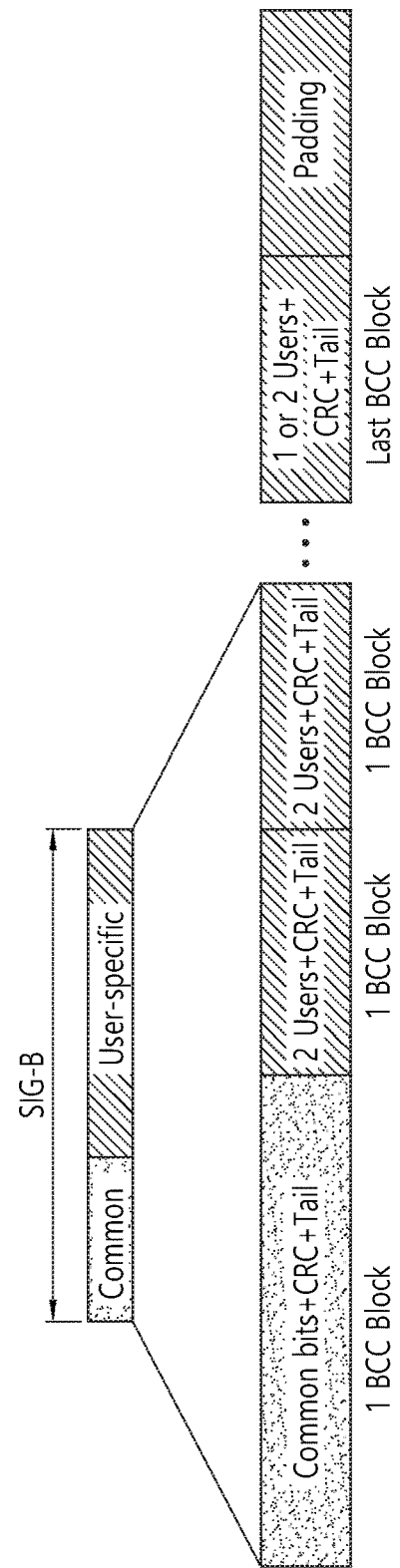
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4(=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of sub-bands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific sub-band (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different sub-bands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific sub-band (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, an embodiment of the present disclosure proposes a signal field of improved performance. That is, an embodiment of the present disclosure proposes a first signal field and/or a second signal field. The first signal field may contain first control information, and the second signal field may contain second control information. For example, a signal (or signal field) according to an embodiment of the present disclosure may be applied on an HE PPDU (high efficiency PPDU) according to the IEEE 802.11ax standard, the first signal field may be an HE-SIG-A field included in an HE PPDU, and the second signal field may be an HE-SIG-B field included in an HE PPDU.

An example of the first control information, although will be described below in more detail, may contain control information for demodulation of the second control information, for example. An example of the second control information, although will be described below in more detail, may contain control information for demodulation of a data field (e.g., the data field on the HE PPDU).

Hereinafter, a first signal field (e.g., HE-SIG-A field) and/or second signal field (HE-SIG-B field) of improved performance will be described. These fields of improved performance may be implemented based on an ordering technique to be described below, or may be implemented in other ways than this ordering technique.

An ordering technique according to an embodiment of the present disclosure may be preferably applied to the second signal field (e.g., HE-SIG-B field). That is, the encoding fields included in the second signal field may be logically ordered, and then assigned to subcarriers in that order.

First Embodiment

According to a first embodiment, the second signal field (e.g., HE-SIG-B field) contains control information for each user (i.e., an AP or non-AP station configured as a receiving station). This control information includes control information for demodulation of the data field on the PPDU. For example, control information on each user may be independently, i.e., individually, configured as an encoded block (hereinafter, referred to as "HE-SIG-B block"). An individual MCS may be applied to each block (i.e., HE-SIG-B block). The first embodiment may be applied when the information size (IS) before application of MCSs is all the same regardless of the size of RUs used. That is, the first embodiment relates to a technique of ordering and grouping each HE-SIG-B block according to the applied MCSs.

An individual MCS may be applied to each HE-SIG-B block—for example, one of the following MCSs may be selectively applied. The schemes below are just some concrete examples, and more examples are available. These MCSs are preferably determined according to the user's geometry and/or channel environment.

MCS10: Uses BPSK. ¼ channel coding rate.
MCS0: Uses BPSK. ½ channel coding rate.
MCS1: Uses QPSK. ½ channel coding rate.
MCS3: Uses 16 QAM. ½ channel coding rate.

Of the aforementioned four schemes, MCS10 may be called the "lowest MCS" because the size of bits (i.e., encoded bits) after encoding according to this MCS is the largest, and MCS3 may be called the "highest MCS" because the size of bits after encoding is the smallest. That is, the lowest MCS is related to a low-level MCS, and the highest MCS is related to a high-level MCS. The above four schemes are advantageous for ordering/grouping that follows because there is a two-fold difference in the size of encoded bits.

Figure 9:
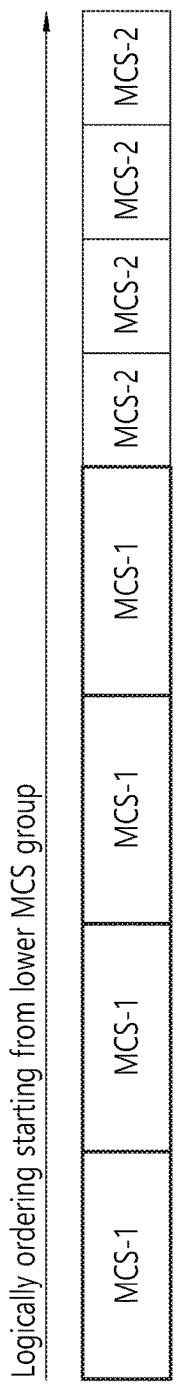
FIG. 9 is a diagram explaining how ordering and grouping are performed when two different MCSs are used for encoding a second signal field (e.g., SIG-B).

FIG. 9 is a diagram explaining how ordering and grouping are performed when two different MCSs are used for encoding a second signal field (e.g., SIG-B).

For example, there may be two MCSs for HE-SIG-B encoding defined by the system. In this case, it is assumed that there are a total of 8 users configured for an OFDMA PPDU, and 4 users are mapped to MCS-1 (lowest MCS) and MCS-2 (highest MCS). Specifically, MCS-1 and MCS-2 are available in the following combinations:

(MCS-1, MCS-2)=(MCS10, MCS0), (MCS10, MCS1), (MCS10, MCS3)

(MCS-1, MCS-2)=(MCS0, MCS1), (MCS0, MCS3)

(MCS-1, MCS-2)=(MCS1, MCS3)

That is, as in FIG. 9, MCS-1 may be applied to the leading encoding blocks (i.e., the HE-SIG-B blocks on the left), and MCS-2 may be applied to the subsequent encoding blocks (i.e., the HE-SIG-B blocks on the right). In this case, the above six combinations are advantageous for ordering/grouping because the block size in MCS-1 is 2*n times larger than that in MCS-2.

Referring to FIG. 9, it can be seen that, after encoding using the lowest MCS, the encoding blocks of MCS-1 of larger size are ordered preferentially at the front portion of HE-SIG-B. Identification information of the UE (i.e., user) of each encoding block may be included in the following method:

Specifically, a user's identification information (AID or PAID (Partial AID) may be masked to the CRC of each encoding block to identify the user. When informing identification information of multiple users at once (MU-MIMO transmission), a GID (group ID) may be masked to the CRC.

Alternatively, in order for UEs (i.e., users) to know the position of their encoding block, an AID or PAID may be addressed before/after each encoding block (i.e., HE-SIG-B block) according to the same sequence as the encoding blocks (or according to a predetermined mapping rule) to identify the users.

Since a UE (i.e., user) does not know which MCS other UEs are encoded by, it is preferable for them to make blind decoding attempts using two MCSs, in order to find their encoding block among the encoding blocks (i.e., HE-SIG-B blocks). In this case, if encoding blocks of larger size are placed at the front, this offers the advantage of minimizing the time and power consumed to find their block. A concrete blind decoding technique is as follows:

First step: A UE (i.e., user) performs decoding to the encoding block size in MCS-1 (i.e., the lowest MCS), starting from the first block of SIG-B.

Second step: The UE may stop the decoding operation if their block is decoded.

Third step: The UE may perform decoding to the next size (i.e., the encoding block size in MCS-2) unless their block is decoded. For example, in a case where an encoding block for a specific user is encoded by MCS-2, decoding cannot be performed in the first and second steps and therefore decoding is performed through the third step.

Fourth step: The UE continues the decoding operation until they discover their encoding block.

The above sequential decoding method may have the problem of having to decode all encoding blocks in the worst case. That is, overhead or complexity problems may occur.

Accordingly, an embodiment of the present disclosure proposes a technique of reducing signaling overhead below.

The technique below may have a technological effect independent from the above-described ordering/grouping technique. The following technique of configuring a first signal field and a second signal field may be performed separately from the above-described ordering/grouping technique.

Preferably, a first signal field (HE-SIG-A) according to an embodiment of the present disclosure provides control information for decoding of a second signal field (e.g., HE-SIG-B). More specifically, the first signal field (e.g., HE-SIG-A field) may include a signal field indicating boundary information of each MCS group. That is, as in FIG. 9, the first signal field (e.g., HE-SIG-A field) may further include control information indicating the boundary between a block encoded by MCS-1 and a block encoded by MCS-2. Since the control information indicating the boundary may be expressed as information indicating the end of a block encoded by MCS-1, it may be called an "end point" indicator or an "end time" indicator. For example, when there are two different MCS groups, as in the example in FIG. 9, an indication of information on the "end time/end point" of the first MCS group will be enough. When there are more than two MCS groups, the "end time/end point" of each MCS group may be indicated, starting from the first MCS group. If the size of an HE-SIG-B can be known, the "end time/end point" information of the last MCS group may be omitted.

Additionally or alternatively to the above-described example, "end time/end point" information may be signaled through a common field at the frontmost part of a second signal field (e.g., HE-SIG-B field) according to an embodiment of the present disclosure. That is, "end time/end point" information may be signaled through the common field shown in FIG. 8. In this case, as illustrated in FIG. 8, the second signal field (e.g., HE-SIG-B field) may include a common field at the frontmost part, and the corresponding common field is encoded separately from the field that follows.

Meanwhile, the actual value indicated by the above-described information on the "end time/end point" of an MCS group may be determined in various ways. For example, it may indicate: 1) the number of HE-SIG-B encoding blocks, 2) the number of OFDM symbols, and 3) a value in bytes or octets. The above example will be explained below in more detail.

Firstly, this information may indicate the number of encoding blocks in each MCS group. For example, in the example of FIG. 9 where four blocks are encoded by MCS-1 and MCS-2 each and these four blocks are grouped into one group, the number of encoding blocks in each MCS group may be set to 4. When the example of FIG. 9 is applied to FIG. 8. The first two MCS-1 blocks in FIG. 9 may correspond to the first one BCC block in FIG. 8, the next two MCS-1 blocks in FIG. 9 may correspond to the second BCC block (not shown) in FIG. 8, the first two MCS-2 blocks in FIG. 9 may correspond to the third BCC block (not shown) in FIG. 8, and the last two MCS-2 blocks in FIG. 9 may correspond to the last BCC block in FIG. 8, and the padding block in FIG. 8 may be included after the last two MCS-2 blocks in FIG. 9.

Secondly, this information may indicate the number of OFDM symbols. An encoding block may be defined by a fixed size of a ¼ OFDM symbol (e.g., MCS3), ½ OFDM symbol (e.g., MCS1), 1 OFDM symbol (e.g., MCS0), or 2 OFDM symbols. OFDM symbol-based forming is a configuration that takes the process/performance of a Viterbi decoder and blind decoding complexity into account.

Figure 10:
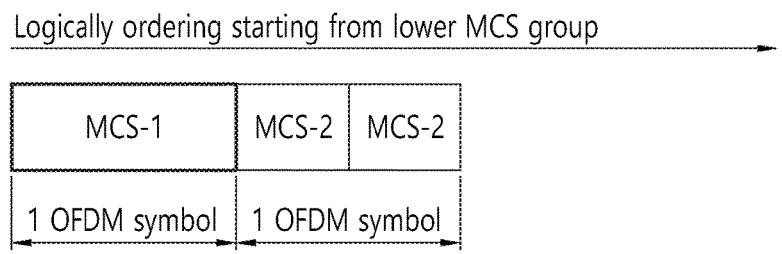
FIG. 10 is a diagram illustrating the concept of ordering/grouping encoded bits based on the number of OFDM symbols.

FIG. 10 is a diagram illustrating the concept of ordering/grouping encoded bits based on the number of OFDM symbols. As illustrated therein, an encoding block coded by the lowest MCS may be defined as 1 OFDM symbol, and, by contrast, an encoding block of encoded bits half the size of those of the encoding block coded by the lowest MCS may have a symbol boundary that is defined for two OFDM symbols. In this case, the specific number of OFDM symbols may change.

Meanwhile, in order to decrease decoding complexity, when giving an indication in units of symbols, a boundary may be set in units of OFDM symbols, corresponding to the number of users for each MCS for encoding. For example, when an MCS3 block of four users (i.e., a block coded with the 16 QAM and ½ channel coding rate stated above), an MCS1 block of two users, and an MCS0 block of one user are assigned to the same OFDM symbol, a boundary may be naturally set per OFDM symbol, regardless of the MCSs applied. In other words, the number of encoding blocks included in one OFDM symbol may be set by taking into account the MCSs and the number of users. This may effectively reduce information on the number of OFDMA symbols with respect to the size of an MCS group to be indicated.

Meanwhile, the above example may be represented as the concept of assigning more users to the same OFDM symbols on the time axis, and a similar technique may be applied on the frequency axis. That is, at 40 MHz and 80 MHz, it is possible to support more users on the frequency axis while maintaining the symbol boundary.

Thirdly, information on "end time/end point" may be indicated in bytes or octets.

Meanwhile, in a wireless LAN system to which an embodiment of the present disclosure is applied as described above, MU-MIMO may be used at least either in downlink or uplink, in addition to OFDMA. Now, a method for configuring a second signal field when MU-MIMO is used in addition to OFDMA will be described.

Specifically, a description will be made with respect to an example of configuring a second signal field (e.g., an HE-SIG-B field) by using an MIMO technique to support multiple users (i.e., MU-MIMO users), in addition to the OFDMA (i.e., SU-OFDMA) technique in which a single user (SU) is assigned to a specific frequency band.

An example of configuring a second signal field (e.g., HE-SIG-B field) by using an OFDMA technique (including supporting SU based on OFDMA or supporting MU-MIMO in addition to OFDMA) is as shown in Tables 1 and 2 below. Tables 1 and 2 may be used together, and only some fields may be selectively used. When the characteristics in Tables 1 and 2 are used together, Table 1 indicates information that can be contained in a common field, and Table 2 indicates an example of a user-specific field subsequent to this common field. The bit sizes in Tables 1 and 2 may vary. Also, some of the bits in Tables 1 and 2 may be omitted, and control bits which are not indicated in Tables 1 and 2 may be included.

Meanwhile, Table 3 below shows an example of a second signal field when OFDMA is not used (i.e., SU or MU is supported in all frequency bands). The bit sizes in Table 3 may vary. Also, some of the bits in Table 3 may be omitted, and control bits which are not indicated in Table 3 may be included.

TABLE 1

| Bits | TBD structure on BW |
|---|---|
| Common SIG-B | |
| Number of per user SIG-B symbols (or number of users) | 4 |
| SIG-B MCS group boundary | 12 |
| FE indication | 0 |
| Data GI | 2 |
| LTE compression factor | 1 |
| Number of LTFs | 3 |
| CRC | 4 |
| Tail | |
| 242 chunk bitmap | |
| Sum | 26 |
| Required symbol(MCS0) | 1 |

TABLE 2

| Bits | Independent 20 MHz | |
|---|---|---|
| Per user SIG-B | OFDMA | MU-MIMO |
| SU/MU-MIMO | 1 | 1 |
| (Partial)AID + CRC | 9 | 9 |
| Assignment | 4 | 2 |
| LTF start index | 0 | 3 |
| Nsts | 3 | 3 |
| STBC | 1 | |
| Coding | 2 | 2 |
| MCS | 4 | 4 |
| SE | 1 | 1 |
| Beamformed | 1 | |
| Tail | | |
| Sum | 26 | 25 |
| Required symbol(MCS0) | 1 | 1 |
| Required symbol(MCS1) | 0.5 | 0.5 |
| Required symbol(MCS3) | 0.25 | 0.25 |

TABLE 3

| Bits | TBD structure on BW | |
|---|---|---|
| Common SIG-B | SU | MU-MIMO |
| SU/MU-MIMO | 1 | 1 |
| MCS | 4 | 4 |
| Start for LTF | 0 | 3 |
| Coding | 2 | 2 |
| Nsts | 3 | 3 |
| STBC | 1 | |
| GI | 2 | 2 |
| SE | 1 | 1 |
| Beamformed | 1 | |
| (Partial)AID + CRC | 9 | 9 |
| Tail | | |
| Sum | 23 | 25 |
| Required symbol(MCS0) | 1 | 1 |

The Table 2 above explains an example of configuring a second signal field (e.g., HE-SIG-B field) when OFDMA (i.e., SU-OFDMA) scheme/technique and MU-MIMO scheme/technique coexist.

As described above, regarding the bit sizes in Table 2, additional bits may be included, or some bits may be omitted. However, as indicated in Table 2, it is preferable that each user-specific field (i.e., per user SIG-B) may be transmitted over the same symbol length, regardless of whether OFDMA (SU-OFDMA) or MU-MIMO is used.

Figure 11:
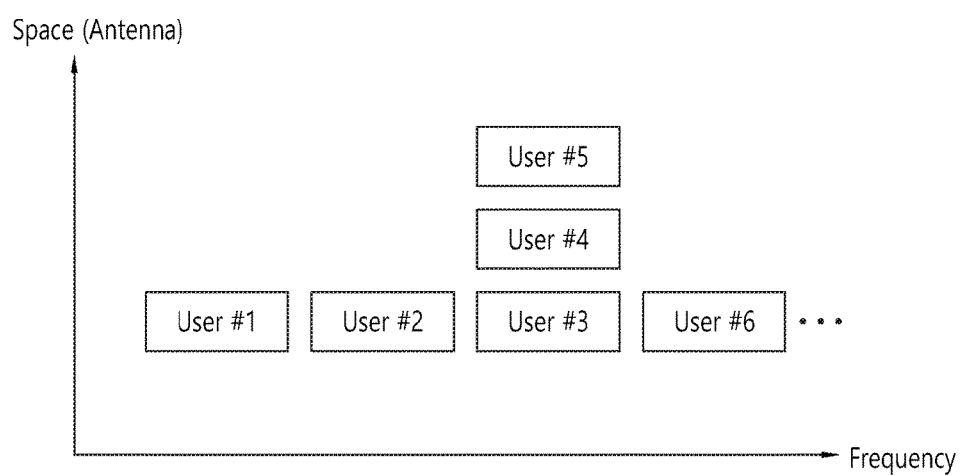
FIG. 11 is a diagram illustrating an example of resource allocation for each user when both OFDMA and MU-MIMO are used.

FIG. 11 is a diagram illustrating an example of resource allocation for each user when both OFDMA scheme and MU-MIMO scheme are used.

As illustrated in FIG. 11, there may be an issue with resource allocation for multiple users (i.e., User #1 to User #6). As described above, a second signal field may exist only when there is an issue with communication for multiple users; otherwise, it may be omitted otherwise. Thus, when there is an issue with the case of FIG. 11, the second signal field is required.

As illustrated therein, only a single user (SU) may be assigned to a specific band (i.e., frequency band). When only one user is assigned to a corresponding band, each user is distinguished by a frequency band to which the user is allocated. That is, each of the illustrated User #1, User #2, and User #6 corresponds to a single user (SU) for a specific band, and resources for each user may be distinguished by its frequency band. In this case, it can be expressed that the corresponding users are allocated resources (e.g., RUs) according to OFDMA or SU-OFDMA scheme.

Meanwhile, multiple users (i.e., MU-MIMO users) may be assigned to another specific band, in which case each user may be identified spatially. That is, each user may be identified according to MIMO scheme. In this case, it can be expressed that the corresponding users (i.e., the illustrated User #3, User #4, and User #5) are allocated resources (e.g., RUs) according to MU-MIMO scheme.

An embodiment of the present disclosure proposes a technique in which each encoded field is set to be the same size, regardless of whether OFDM or MIMO scheme is used, when configuring a user-specific field for each user (i.e., User #1 to User #6).

Figure 12:
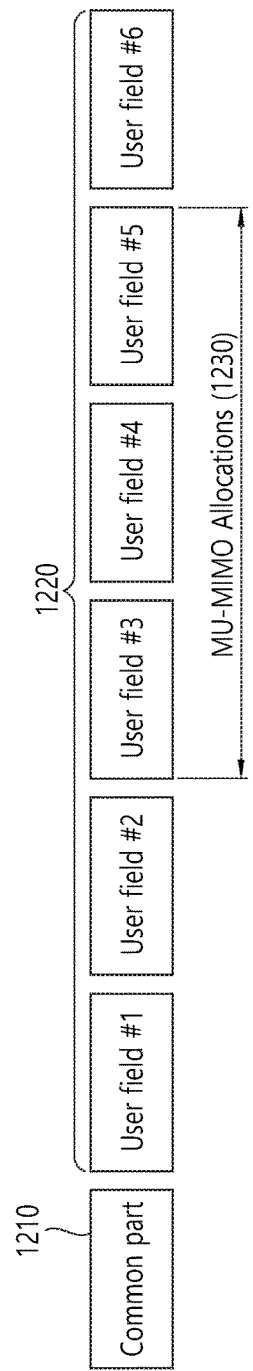
FIG. 12 shows an example of a second signal field according to an embodiment of the present disclosure.

FIG. 12 shows an example of a second signal field according to an embodiment of the present disclosure.

As illustrated therein, the second signal field (e.g., HE-SIG-B field) may include a common field 1210 and a user-specific field 1220. As described above, the user-specific field 1220 may be called "per user SIG-B" or "SIG-B per user content". Also, the user-specific field 1220 may include user fields corresponding to the number of users.

FIG. 12 shows an example of configuring a second signal field when users are assigned in the way shown in the example of FIG. 11. As described above, OFDMA (i.e., SU-OFDMA) scheme is applied to Users #1, #2, and #6. In other words, per RU SU allocation is performed for Users #1, #2, and #6. That is, Users #1, #2, and #6 each may be allocated one RU. By contrast, MU-MIMO scheme is applied to Users #3, #4, and #5. In other words, MU-MIMO allocation 1230 is performed for users #3, #4, and #5. That is, Users #1, #2, and #6 may be commonly allocated one RU. To sum up, the user-specific field 1220 may be used for a single user assigned to a preset/predefined band, and also may be used for multiple users in another predefined band.

In this embodiment, as described above, it is preferable that each of the encoding blocks (e.g., HE-SIG-B blocks shown in FIG. 9, etc.) or the corresponding user-specific field 1220 may be the same size. Accordingly, as explained in Table 3, each of them may be preferably transmitted through the same number of OFDM symbols. In other words, the size of the user fields may be the same, irrespective of whether the allocation is for a user (i.e., STA) in an SU or an MU-MIMO allocation. That is, if the user-specific field 1220 includes a plurality of user fields, the size of each user field may be preferably the same, irrespective of whether each user field of the plurality of user fields is used for a single user (SU) or multiple users (MU). To this end, a particular bit in a small-size field, among the user fields used for SU or MU, may be used as a reserved field/bit. The user fields for SU and MU may be set to be the same size through the reserved field/bit.

Meanwhile, the technique of improving the configuration of a second signal field, as an addition or alternative to the above-described examples of FIGS. 11 and 12, will be described below.

When MU-MIMO is supported, the first signal block may indicate signaling for all MU-MIMO users (e.g., it may include information on the first user as well), and the second and subsequent signal blocks may be configured in units of OFDM symbols (e.g., each signal block may be configured per OFDM symbol) by grouping information of the other users. For example, the first signal block may correspond to the common field 1210 of FIG. 12, and the second and subsequent signal blocks may correspond to the user-specific field 1220 of FIG. 12. The second signal block will be described as follows. In this case, it may be assumed that the first signal block already includes the following information on the first user.

Specifically, a total of 12 bits of information, made up of MCS(4), Coding(2), Nsts(3), GI(2), and SE(1), may be included. It is half the size of one OFDM symbol, and allows for multi-user grouping. That is, when MCS0 is applied, a signal block of 12 bits of information may be configured per OFDM symbol by combining information on a maximum of two remaining MU-MIMO users. Also, when MCS1 is applied, a signal block of 12 bits of information may be configured per OFDM symbol by combining information on a maximum of four remaining MU-MIMO users. Also, when MCS3 is applied, a signal block of 12 bits of information may be configured per OFDM symbol by combining information on a maximum of eight remaining MU-MIMO users.

Figure 13:
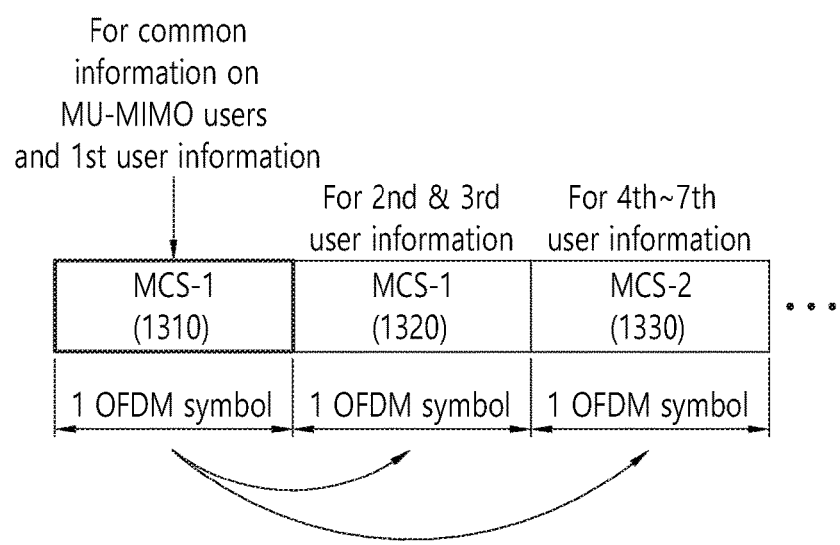
FIG. 13 is a diagram explaining multi-user grouping according to an embodiment of the present disclosure.

FIG. 13 is a diagram explaining multi-user grouping according to an embodiment of the present disclosure.

The above-described first block may correspond to the MCS-1 1310 of FIG. 13, and may include signaling for all MU-MIMO users as described above and additionally include information on the first user. The MCS-1 1320 is an example of the signal block of 12 bits of information that is configured per OFDM symbol as described above by combining information on a maximum of two remaining MU-MIMO users according to MCS0. The MCS-2 1330 is an example of the above-described signal block of 12 bits of information that is configured per OFDM symbol as described above by combining information on a maximum of four remaining MU-MIMO users.

The specific available MCSs, the number of users, and the specific number of OFDM symbols shown in FIG. 13 may change. Moreover, the number of signal blocks included in an OFDM symbol unit may vary, which is expanded depending on the MCSs applied and/or the number of MU-MIMO users. In this case, at least one padding may be added to the last symbol to have it aligned with the OFDM symbol boundary.

To transmit the above information, transmission of additional OFDM symbol(s) may be indicated through an SU/MU-MIMO indication field. For example, when the SU/MU-MIMO field is set to "1", this may indicate that additional OFDM symbols for transmitting information on the remaining MU-MIMO users will follow. That is, it is indicated that, in FIG. 13, the MCS-1 1320 and the MCS-2 1330 come after the MCS-1 1310. Preferably, signal blocks (e.g., the MCS-1 1320 and MCS-2 1330 of FIG. 13) for all additional MU-MIMO users are transmitted in alignment with the OFDM symbol boundary. Moreover, user information grouping may vary depending on the MCSs applied.

The example of FIG. 13 may be extensively applied at 40 MHz and 80 MHz as well as at 20 MHz.

Although some of the above-described examples use two MCSs when configuring a second signal field, the number of MCSs is not limited. For example, three MCSs may be used.

Figure 14:
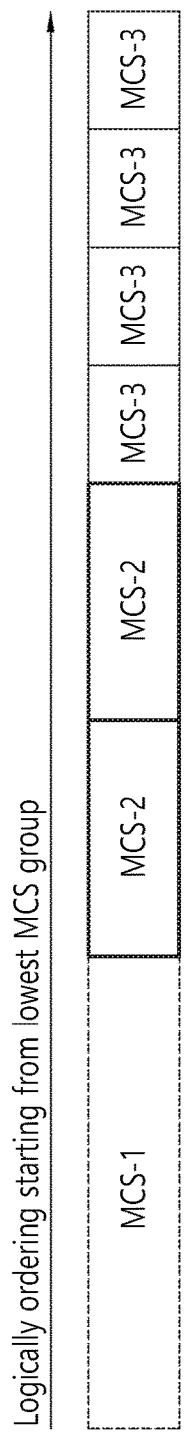
FIG. 14 is a diagram illustrating a method for configuring a second signal field when three MCSs are used.

For example, when it is assumed that there are a total of 8 users configured for OFDMA PPDU and one user, two users, and five users are sequentially mapped to MCS-1 (lowest MCS), MCS-2 (intermediate MCS), and MCS-3 (highest MCS), respectively, ordering/encoding may be performed as in FIG. 14.

FIG. 14 is a diagram illustrating a method for configuring a second signal field when three MCSs are used. As illustrated in FIG. 14, blocks encoded according to the lowest MCS may be ordered preferentially.

MCS-1, MCS-2, and MCS-3 may be mapped to specific MCSs by the following combinations:

(MCS-1, MCS-2, MCS-3)=(MCS10, MCS0, MCS1), (MCS10, MCS0, MCS3), (MCS10, MCS1, MCS3)

(MCS-1, MCS-2, MCS-3)=(MCS0, MCS1, MCS3)

Referring to FIG. 14, it can be seen that encoding blocks of MCS-1 of larger size are ordered preferentially at the front portion of the second signal field (e.g., HE-SIG-B field) according to the lowest MCS, followed by MCS-2 groups, and then MCS-3 groups are positioned at the end according to the highest MCS. Identification of users among the encoding blocks may be performed as in the example of FIG. 9.

Now, blind decoding will be explained.

Since a UE (i.e., user) does not know which MCSs other users are encoded by, they have to make blind decoding attempts using three MCSs, in order to find their encoding block among the HE-SIG-B blocks. A concrete blind decoding procedure may be as follows:

First step: A UE (i.e., user) performs decoding to the encoding block size in MCS-1 (i.e., the lowest MCS), starting from the first block of SIG-B.

Second step: The UE may stop the decoding operation if their block is decoded.

Third step: The UE may perform decoding to the next size (i.e., the encoding block size in MCS-2 or MCS-3) unless their block is decoded. For example, in a case where an encoding block for a specific user is encoded by MCS-2 or MCS-3, decoding cannot be performed in the first and second steps and therefore decoding is performed through the third step.

Fourth step: The UE continues the decoding operation until they discover their encoding block.

The above sequential decoding method may have the problem of having to decode all encoding blocks in the worst case. That is, overhead or complexity problems may occur. Accordingly, the method of overhead reduction applied to FIG. 9 may be applied equally to the example of FIG. 14.

Second Embodiment

The second embodiment below proposes an improved technique on a second signal field (e.g., HE-SIG-B field), as in the foregoing first embodiment. The second embodiment proposes a technique in which all the characteristics of the first embodiment are applicable and ordering and grouping are performed based on the information size (IS) before application of MCS to the second signal field.

Specifically, the information size (IS) before application of MCS may be independently/individually set for the blocks (e.g., HE-SIG-B blocks) in the second signal field that are configured independently (i.e., individually) for each user. That is, when different RUs are used, the information size (IS) may be individually set. Thus, grouping is preferably performed by taking into account information size (IS) as well as MCS. In this case, it is preferable that the MCS group of the largest size encoded by the lowest MCS and the IS group of the largest size encoded to the largest information size (IS) are allocated to the frontmost part of the second signal field.

The information sizes of the HE-SIG-B blocks, as well as MCS information, are not known to UEs that decode the HE-SIG-B field. This increases the complexity of blind decoding. To solve this, this embodiment proposes the following technique.

Specifically, information sizes (IS) may be allocated in two types of tone units: 26 tone units (i.e., 1×26, 2×26, and 4×26+4=108 tone units) and 242 tone units (i.e., 1×242 and 2×242 tone units). Moreover, more than two information sizes (IS) may be used. For example, {1×26, 2×26} may be classified as a first group, {4×26+4=108} may be classified as a second group, and {1×242, 2×242} may be classified as a third group. Alternatively, {1×26, 2×26, 4×26+4=108} may be classified as a first group, {1×242} may be classified as a second group, and {2×242} may be classified as a third group. Moreover, for single-user (SU) transmission, grouping may be performed for 994 or 996 tone transmission at 80 MHz.

The following example proposes a method in which each information sizes is specified as IS-x (x=1, 2, . . . ), grouped into different IS-x groups, and ordered in order of largest to smallest size. MCS groups and IS groups may be ordered as follows.

First ordering technique: The second signal field may be configured by ordering MCS groups in order of lowest to highest MCS groups and then ordering information size (IS) groups in each MCS group in order of highest to lowest MCS groups. The first ordering technique may be described concretely with reference to FIG. 15.

Second ordering technique: The second signal field may be configured by ordering IS groups in order of highest to lowest IS groups and then ordering MCS groups in each IS group in order of lowest to highest IS groups. The second ordering technique may be described concretely with reference to FIG. 16.

Figure 15:
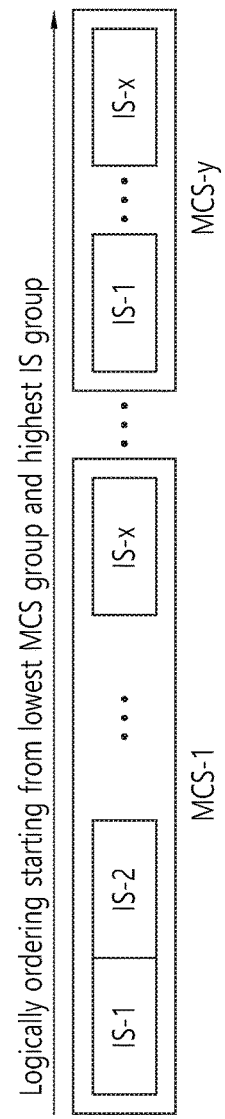
FIG. 15 is a diagram illustrating a technique of configuring a second signal field based on MCSs and information sizes according to an embodiment of the present disclosure.

FIG. 15 is a diagram illustrating a technique of configuring a second signal field based on MCSs and information sizes according to an embodiment of the present disclosure.

Referring to FIG. 15, encoding blocks may be ordered sequentially, starting from the blocks to which the lowest MCS is applied (i.e., the lowest MCS blocks) to the encoding blocks in the highest MCS group. Also, ISs in each MCS group may be ordered in order of highest to lowest ISs (the lower the value x of 'IS-x' in the figure, the larger the IS).

In FIG. 15, the encoding blocks (e.g., SIG-B blocks) of all users to which the same MCS (e.g., the lowest MCS) is applied may be allocated to the first MCS-1 group, and the encoding blocks of all users to which MCS-y is applied may be allocated to the MCS-y group. A method of identifying the UE of each encoding block is as follows.

Example 1—A user's identification information (e.g., AID or PAID (Partial AID) may be masked to the CRC of each encoding block to identify the user. When informing identification information of multiple users at once (MU-MIMO transmission), a GID (group ID) may be masked to the CRC. The user identification information may be hierarchically classified by MCS groups, IS groups, and combinations of MCS and IS groups.

Example 2—In order for UEs (i.e., users) to know the position of their encoding block, an AID or PAID may be addressed before/after each encoding block (i.e., HE-SIG-B block) of the second signal field according to the same sequence as the encoding blocks (or according to a predetermined mapping rule) to identify the users. The sequence of AIDs/PAIDs or the sequence according to the mapping rule may be hierarchically organized by MCS groups, IS groups, and combinations of MCS and IS groups.

Now, a blinding decoding technique will be explained.

Since a UE (i.e., user) does not know which MCS other users are encoded by, they have to make blind decoding using all possible MCSs and all possible ISs, in order to find their encoding block among the encoding blocks (e.g., HE-SIG-B blocks) in the second signal field. In this case, if encoding blocks of larger size (i.e., the lowest MCS group) are placed at the front and IS groups of larger size (i.e., the highest IS group) in the lowest MCS group are placed at the front, this offers the advantage of minimizing the time and power consumed to find their block in terms of probability. A concrete operation for discovering their encoding block is as follows:

First step: A user performs decoding to the encoding block size in {MCS-1, IS-1}, starting from the first block.

Second step: If the user discovers the encoding block allocated to them (for example, if they are a user in {MCS-1, IS-1}), they stop the decoding.

Third step: If the user does not discover their encoding block, they perform additional decoding to the encoding block size in {MCS-1, IS-2}. Afterwards, they repeatedly perform decoding until they discover their encoding block during {MCS-1, IS-3}, . . . ,{MCS-1,IS-x}.

Fourth step: If the user does not discover their encoding block in the first MCS group, they start decoding based on the size of the next MCS group. The subsequent operation is identical to the first to third steps.

According to the above technique, in the worst case, the user has to decode all encoding blocks, which leads to an overhead increase. The following embodiment proposes a technique of indicating specific control information using a common control signal, in order to reduce such overhead.

First method: The first signal field (e.g., HE-SIG-A field) may indicate each MCS group's boundary information (i.e., "end point" or "end time" information indicating the end of a specific group) and each IS group's boundary information (i.e., "end point" or "end time" information indicating the end of a specific group). For two MCS groups and two IS groups, a total of four types of group information—MCS-1, MCS-2, IS-1, and IS-2—may be transmitted. If the overall size of the second signal field (e.g., HE-SIG-B) is known, the "end time" information of the last group may be omitted.

Second method: A common control part may be placed at the front portion of the second signal field to include the "end point" information of the first method. That is, "end point" information may be included in the common field shown in FIG. 8.

In the above method, the "end point" or "end time" information may be indicated by 1) the number of encoding blocks (e.g., HE-SIG-B encoding blocks) of the second signal field belonging to each MCS or IS group; 2) an OFDM symbol unit (e.g., a ½ OFDM symbol, 1 OFDM symbol, or 2 OFDM symbols)—for example, the size of an OFDM symbol unit may be set to 2 OFDM symbols for {MCS-1, IS-1}, 1 OFDM symbol for {MCS-1, IS-2}, and a ½ OFDM symbol for {MCS-2, IS-1}; or 3) a value in bytes or octets Third method: If signaling overhead on group information is high, information on only one group may be transmitted. In this case, blind decoding is performed on other groups whose information is not transmitted. For example, information on one MCS group or IS group may be transmitted.

Fourth method: The index of a combination of groups (MCS and IS groups) may be signaled. For example, when two MCS groups and two IS groups are used, a total of four types of group information may be independently and separately transmitted, but this may involve an overhead problem. Thus, this information may be configured and transmitted limitedly as a look-up table.

For example, possible combinations are {MCS-1, IS-1}, {MCS-1, IS-2}, {MCS-2, IS-1}, and {MCS-2, IS-2}. When information on the combinations are provided in a limited configuration, rather than sending size information of all groups individually, only a few bits of a signaling field may be needed, thereby enabling efficient signaling design. For example, the following tables may be constructed depending on the configuration of MCS-y and IS-x, and only the index value may be signaled in the frontmost block of the first signal field (e.g., HE-SIG-A field) and/or the second signal field (e.g., HE-SIG-B field). In the example of the following Table 4, if the overall size of the second signal field (e.g., HE-SIG-B) is known, information in the last column of each table may be omitted as in the example of FIG. 5. The values shown in Tables 4 and 5 are the number of encoding blocks present in the corresponding combinations of groups. If there is a limit to the maximum number of users who can use OFDMA multiple access, the table values may be configured to meet this number.

TABLE 4

| Index | MCS-1, IS-1 | MCS-1, IS-2 | MCS-2, IS-1 | MCS-2, IS-2 |
| --- | --- | --- | --- | --- |
| 0 | 1 | 1 | 1 | 1 |
| 1 | 2 | 1 | 1 | 1 |
| 2 | 3 | 1 | 1 | 1 |
| . . . | | | | |
| . . . | | | | |

TABLE 5

| Index | MCS-1, IS-1 | MCS-1, IS-2 | MCS-2, IS-1 |
| --- | --- | --- | --- |
| 0 | 1 | 1 | 1 |
| 1 | 2 | 1 | 1 |
| 2 | 3 | 1 | 1 |
| . . . | | | |
| . . . | | | |

Now, the above-described second ordering technique will be explained with reference to FIG. 16.

Figure 16:
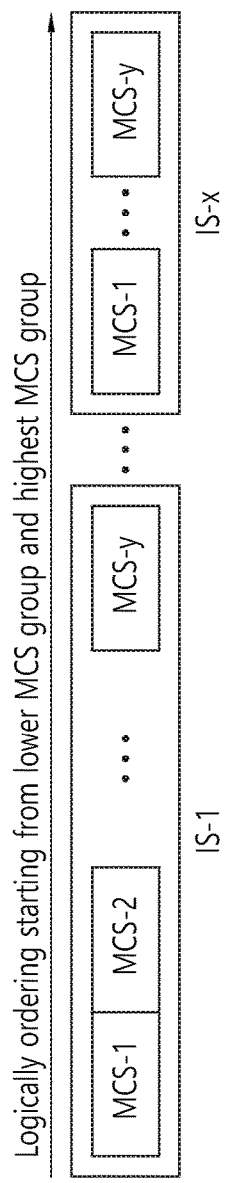
FIG. 16 is a diagram illustrating another technique of configuring a second signal field based on MCSs and information sizes according to an embodiment of the present disclosure.

FIG. 16 is a diagram illustrating another technique of configuring a second signal field based on MCSs and information sizes according to an embodiment of the present disclosure.

Referring to FIG. 16, the encoding blocks (e.g., HE-SIG-B) in the second signal field may be ordered in order of highest to lowest IS groups. As described above, the lower the value x of 'IS-x', the larger the size of the IS group. Also, the blocks in each MCS group may be ordered in order of lowest to highest MCS. In FIG. 16, the encoding blocks of all MCS users according to IS-1 may be allocated to the first IS-1 group, and the encoding blocks of all MCS users according to IS-x may be allocated to the IS-x group. A method of identifying the UE of each encoding block is as follows.

Example 1—A user's identification information (e.g., AID or PAID (Partial AID) may be masked to the CRC of each encoding block to identify the user. The user identification information may be hierarchically classified by MCS groups, IS groups, and combinations of MCS and IS groups.

EXAMPLE 2—In order for UEs (i.e., users) to know the position of their encoding block, an AID or PAID may be addressed before/after each encoding block (i.e., HE-SIG-B block) of the second signal field according to the same sequence as the encoding blocks (or according to a predetermined mapping rule) to identify the users. The sequence of AIDs/PAIDs or the sequence according to the mapping rule may be hierarchically organized by MCS groups, IS groups, and combinations of MCS and IS groups.

Now, a blinding decoding technique will be explained.

Since a UE (i.e., user) does not know which MCS other users are encoded by, they have to make blind decoding attempts using all possible MCSs and all possible ISs, in order to find their encoding block among the encoding blocks (e.g., HE-SIG-B blocks) in the second signal field. In this case, if encoding blocks of larger size (i.e., the lowest MCS group) are placed at the front and IS groups of larger size (i.e., the highest IS group) in the lowest MCS group are placed at the front, this offers the advantage of minimizing the time and power consumed to find their block in terms of probability. A concrete operation for discovering their encoding block is as follows:

First step: A user performs decoding to the encoding block size in {IS-1, MCS-1}, starting from the first block.

Second step: If the user discovers the encoding block allocated to them (for example, if they are a user in {IS-1, MCS-1}), they stop the decoding.

Third step: If the user does not discover their encoding block, they perform additional decoding to the encoding block size in {IS-1, MCS-2}. Afterwards, they repeatedly perform decoding until they discover their encoding block during {IS-1, MCS-3}, . . . ,{IS-1,MCS-x}.

Fourth step: If the user does not discover their encoding block in the first IS group, they start decoding based on the size of the next IS group. The subsequent operation is identical to the first to third steps.

According to the above technique, in the worst case, the user has to decode all encoding blocks, which leads to an overhead increase. The following embodiment proposes a technique of indicating specific control information using a common control signal, in order to reduce such overhead.

First method: The first signal field (e.g., HE-SIG-A field) may indicate each MCS group's boundary information (i.e., "end point" or "end time" information indicating the end of a specific group) and each IS group's boundary information (i.e., "end point" or "end time" information indicating the end of a specific group). For two MCS groups and two IS groups, a total of four types of group information—MCS-1, MCS-2, IS-1, and IS-2—may be transmitted. If the overall size of the second signal field (e.g., HE-SIG-B) is known, the "end time" information of the last group may be omitted.

Second method: A common control part may be placed at the front portion of the second signal field to include the "end point" information of the first method. That is, "end point" information may be included in the common field shown in FIG. 8.

In the above method, the "end point" or "end time" information may be indicated by 1) the number of encoding blocks (e.g., HE-SIG-B encoding blocks) of the second signal field belonging to each MCS or IS group; 2) an OFDM symbol unit (e.g., a ½ OFDM symbol, 1 OFDM symbol, or 2 OFDM symbols)—for example, the size of an OFDM symbol unit may be set to 2 OFDM symbols for {IS-1, MCS-1}, 1 OFDM symbol for {IS-1, MCS-2}, and a ½ OFDM symbol for {IS-2, MCS-1}; or 3) a value in bytes or octets Third method: If signaling overhead on group information is high, information on only one group may be transmitted. In this case, blind decoding is performed on other groups whose information is not transmitted. For example, information on one MCS group or IS group may be transmitted.

Fourth method: The index of a combination of groups (MCS and IS groups) may be signaled. For example, when two MCS groups and two IS groups are used, a total of four types of group information may be independently and separately transmitted, but this may involve an overhead problem. Thus, this information may be configured and transmitted limitedly as a look-up table.

For example, possible combinations are {IS-1, MCS-1}, {IS-1, MCS-2}, {IS-2, MCS-1}, and {IS-2, MCS-2}. When information on the combinations are provided in a limited configuration, rather than sending size information of all groups individually, only a few bits of a signaling field may be needed, thereby enabling efficient signaling design. For example, the following tables may be constructed depending on the configuration of MCS-y and IS-x, and only the index value may be signaled in the frontmost block of the first signal field (e.g., HE-SIG-A field) and/or the second signal field (e.g., HE-SIG-B field). In the example of the following Table 6, if the overall size of the second signal field (e.g., HE-SIG-B) is known, information in the last column of each table may be omitted as in the example of FIG. 7. The values shown in Tables 6 and 7 are the number of encoding blocks present in the corresponding combinations of groups. If there is a limit to the maximum number of users who can use OFDMA multiple access, the table values may be configured to meet this number.

TABLE 6

| Index | IS-1, MCS-1 | IS-1, MCS-2 | IS-2, MCS-1 | IS-2, MCS-2 |
|-------|-------------|-------------|-------------|-------------|
| 0 | 1 | 1 | 1 | 1 |
| 1 | 2 | 1 | 1 | 1 |
| 2 | 3 | 1 | 1 | 1 |
| . . . | | | | |
| . . . | | | | |

TABLE 7

| Index | MCS-1, IS-1 | MCS-1, IS-2 | MCS-2, IS-1 |
|-------|-------------|-------------|-------------|
| 0 | 1 | 1 | 1 |
| 1 | 2 | 1 | 1 |
| 2 | 3 | 1 | 1 |
| . . . | | | |
| . . . | | | |

Third Embodiment

In the foregoing first and second embodiments, when different MCSs are used for the second signal field, different MCS groups are distinguished using the time domain. That is, a specific, first MCS group (and/or IS group) is transmitted through a specific OFDM symbol, and a second MCS group (and/or IS group) is transmitted through another OFDM symbol. By contrast, the third embodiment proposes a technique of distinguishing MCS groups using different frequency domains. That is, users for the second signal field (e.g., SIG-B field) to which the same MCS is applied are assigned together to a specific band of 20 MHz (or a predefined band), which allows application of multiple MCSs within a single PPDU.

Figure 17:
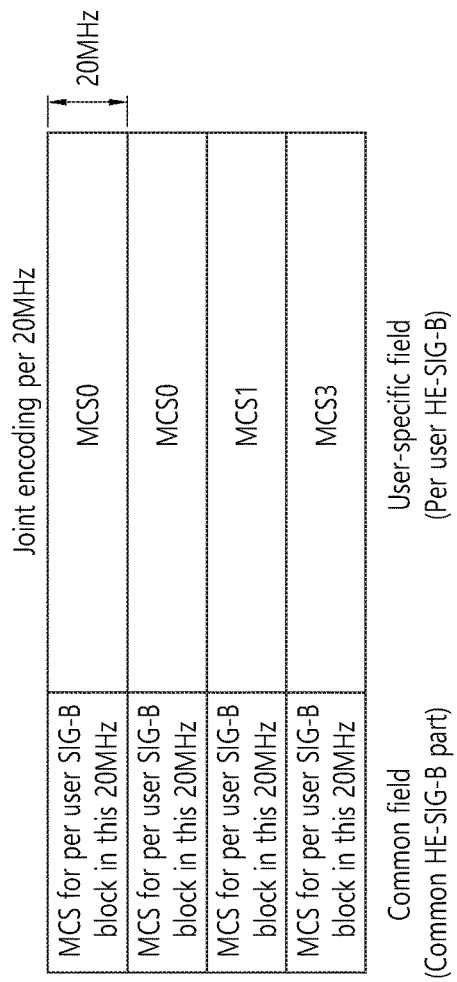
FIG. 17 is a diagram illustrating an example of applying multiple MCSs using multiple frequency bands.

FIG. 17 is a diagram illustrating an example of applying multiple MCSs using multiple frequency bands. That is, the example of FIG. 17 is related to HE-SIG-B blocks that are independently configured for every 20 MHz.

In the example of FIG. 17, multiple MCSs are applied to HE-SIG-B and distinguished using the frequency domain, thereby reducing signaling overhead on MCS. For example, SIG-B information of MCS0 users (to which MCS0 is applied) may be positioned in a specific 20 MHz band, SIG-B information of MCS1 users may be positioned in another specific 20 MHz band, and SIG-B information of MCS3 users may be positioned in yet another specific 20 MHz band.

The common fields and user-specific fields shown in FIG. 17 may be independently encoded as in the example of FIG. 8, or may be encoded together, with the common fields being positioned at the front. The four common fields shown in FIG. 17 each may be used for the corresponding 20 MHz band. That is, each common field may include an information field indicating MCS information for the user-specific field (i.e., per user HE-SIG-B block shown in the figure) in the corresponding 20 MHz. The size of the corresponding information field may be determined depending on the number of MCSs applicable to SIG-B. For example, when four MCSs are applied (e.g., MCS0, 1, 3, and 5), this information field may be made up of 2 bits of information.

Meanwhile, the first signal field (i.e., HE-SIG-A) may indicate MCS information for the user-specific field (i.e., per user HE-SIG-B block shown in the figure). In this case, no MCS information may be included in the common field of FIG. 17. When indicating MCS information through the first signal field, the first signal field may be duplicated and transmitted for every 20 MHz. Thus, in HE-SIG-B, a total of 8 bits of information, rather than 2 bits per 20 MHz, may be transmitted at once for 80 MHz.

Figure 18:
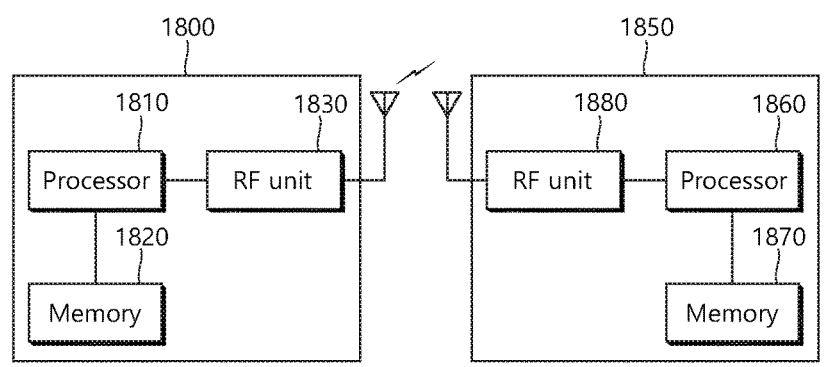
FIG. 18 is a block diagram of a wireless device according to an embodiment of the present disclosure.

FIG. 18 is a block diagram of a wireless device according to an embodiment of the present disclosure.

Referring to FIG. 18, the wireless device is an STA that may implement the above-described embodiments, which may be an AP 1900 or a non-AP station (non-AP STA). The wireless device may correspond to the above-described user or may correspond to a transmitter that transmits a signal to the user.

The AP 1800 includes a processor 1810, a memory 1820, and a radio frequency unit (RF unit) 1830.

The RF unit 1830 may be connected to the processor 1810 to transmit and receive radio signals.

The processor 1810 may implement the functions, processes, and/or methods proposed in the present disclosure. For example, the processor 1810 may perform the operations according to the above-described embodiments of the present disclosure. That is, the processor 1810 may perform the operations that can be performed by the AP, among the operations disclosed in the embodiments of FIG. 1 to FIG. 17.

The non-AP STA 1850 includes a processor 1860, a memory 1870, and a radio frequency unit (RF unit) 1880.

The RF unit 1880 may be connected to the processor 1860 to transmit and receive radio signals.

The processor 1860 may implement the functions, processes, and/or methods proposed in the embodiments of the present disclosure. For example, the processor 1860 may perform the non-AP STA operations according to the above-described embodiments of the present disclosure. The processor may perform the operations of the non-AP STA, which are disclosed in the embodiments of FIG. 1 to FIG. 17.

The processor 1810 and 1860 may include an application-specific integrated circuit (ASIC), other chipsets, a logic circuit, a data processor, and/or a converter to convert a baseband signal and a radio signal from one to the other. The memories 1820 and 1870 may include a read-only memory (ROM), a random access memory (RAM), a flash memory, a memory card, a storage medium, and/or other storage devices. The RF units 1830 and 1880 may include at least one antenna to transmit and/or receive a radio signal.

When the embodiments are implemented with software, the foregoing schemes may be implemented by modules (processes, functions, or the like) for performing the foregoing functions. The modules may be stored in the memories 1820 and 1870 and be executed by the processors 1810 and 1860. The memories 1820 and 1870 may be disposed inside or outside the processors 1810 and 1860 or be connected to the processors 1810 and 1860 via various well-known means.

What is claimed is:

1. A method for transmitting a signal containing control information in a wireless LAN, the method comprising:
configuring, by a transmitting station, a first signal field containing first control information;
configuring, by the transmitting station, a second signal field containing second control information; and
transmitting, by the transmitting station, a physical layer protocol data unit (PPDU) containing the first signal field, the second signal field, and a data field,
wherein the first control information comprises control information for demodulation of the second control information,
the second control information comprises control information for demodulation of the data field,
the second signal field comprises a common field containing common control information and a user-specific field containing user-specific control information,
the user-specific field is encoded separately from the common field, and comprises a plurality of user fields, and
irrespective of whether each user field of the plurality of user fields is used for a single user or multiple users assigned to a predefined band, a size of each user field is set to be the same.

2. The method of claim 1, wherein the first control information is an HE-SIG-A field, and the second control information is an HE-SIG-B field.

3. The method of claim 1, wherein the first control information comprises a first MCS field indicating MCS information used for the second control information, and the second control information comprises a second MCS field indicating MCS information used for the data field.

4. The method of claim 1, wherein the common field of the second control information comprises information for allocating resource units to the single user or multiple users.

5. The method of claim 1, wherein the predefined band is designated by the common field of the second control information.

6. The method of claim 1, wherein, in the PPDU, an short training field (STF) and a long training field (LTF) are included between the second signal field and the data field, and the first signal field and second signal field have a subcarrier frequency spacing that is 4 times longer than that of the STF, LTF, and data field.

7. The method of claim 6, wherein each symbol of the first signal field and second signal field has an IDFT/DFT period that is 4 times shorter than that of each symbol of the STF, LTF, and data field.

8. The method of claim 1, wherein the first signal field comprises a bandwidth field, a downlink/uplink indication field, and a cyclic prefix (CP) length field.

9. The method of claim 1, wherein the multiple users are multiplexed by MU-MIMO scheme in the same predefined band.

10. The method of claim 1, wherein the common field indicates frequency allocation information for different users.

11. The method of claim 1, wherein each user-specific field comprises the identifier of a corresponding user.

12. A device configured as a transmitting station in a wireless LAN system, comprising:
- a radio frequency (RF) unit transmitting a signal containing control information; and
- a processor connected to the RF unit,
- wherein the processor is configured to configure a first signal field containing first control information and a second signal field containing second control information and transmit a physical layer protocol data unit (PPDU) containing the first signal field, the second signal field, and a data field, wherein the first control information comprises control information for demodulation of the second control information, the second control information comprises control information for demodulation of the data field, the second signal field comprises a common field containing common control information and a user-specific field containing user-specific control information, the user-specific field is encoded separately from the common field, and comprises a plurality of user fields, and irrespective of whether each user field of the plurality of user fields is used for a single user or multiple users assigned to a predefined band, a size of each user field is set to be the same.

* * * * *